Dec. 13, 1932.    R. FLUCK ET AL    1,890,459
PROCESS OF MAKING FERTILIZERS FROM FECES OR THE LIKE
Filed June 4, 1927
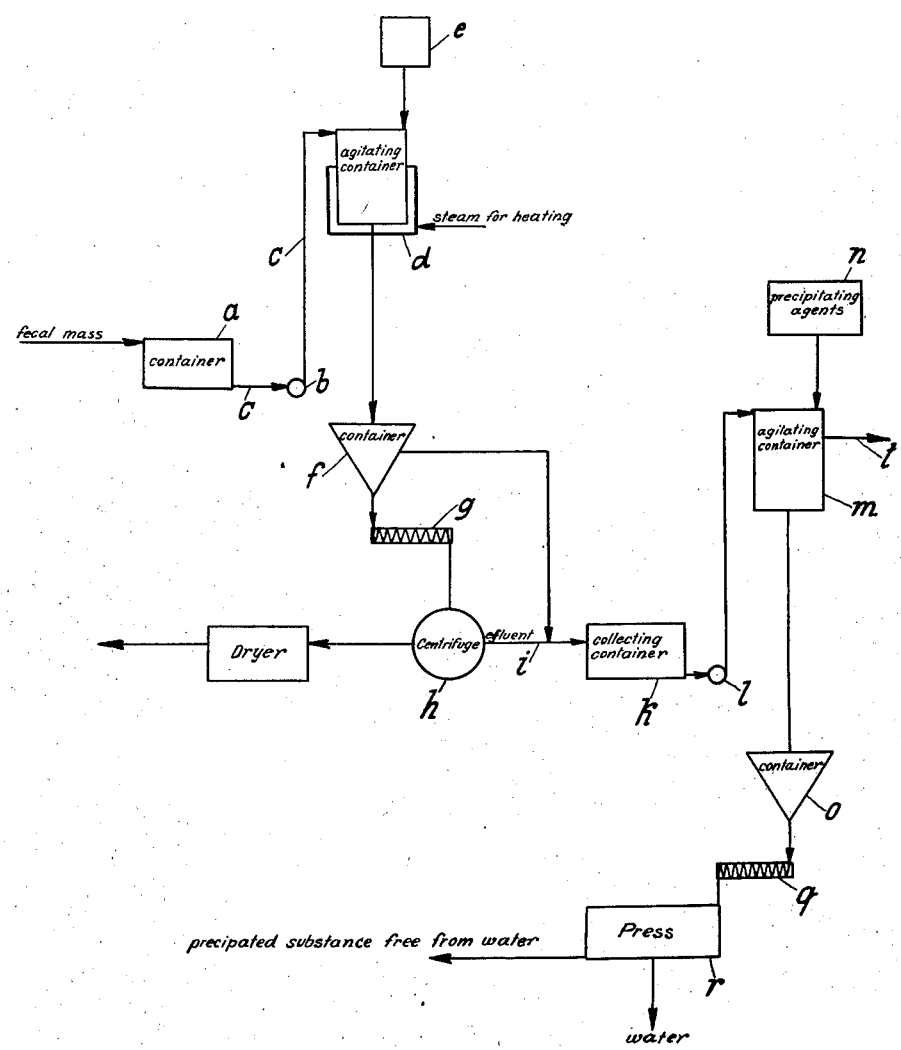

Patented Dec. 13, 1932

1,890,459

UNITED STATES PATENT OFFICE

RICHARD FLUCK, OF BERLIN, AND ALFRED THEIL, OF BERLIN-SCHMARGENDORF, GERMANY, ASSIGNORS TO WILHELM von RADOWITZ, OF BERLIN, GERMANY

PROCESS OF MAKING FERTILIZERS FROM FECES OR THE LIKE

Application filed June 4, 1927, Serial No. 196,628, and in Germany June 23, 1926.

This invention has for its object the treatment of feces or excrements which may be gained from a pit, tun or cask system as well as from a separating system of sewers, such as, for instance, the Liénur-system.

Our invention consists in an improved method of treating the above-mentioned materials by adequately mixing them with a small amount of an absorbent material selected from the group of peat, or lignite, raising the temperature of the mixture to about 60° C., while agitating said mixture, separating the mixture into a mud which moves towards the bottom and into a liquid above said mud, carrying off said liquid by a siphon or similar means, and finally centrifuging said mud for desiccating purposes.

We now will give a full description of the process according to our invention which will enable others skilled in the art to which it appertains to use the same. It will be understood that we are not describing the treatment of sewage, that is the liquid matter usually sprinkled on sewage-fields, but the treatment of animal or fecal matter, of excreta, of night-soil and the like contained in sewage.

In carrying out our invention we preferably take a tank or container which might be air-tight or not. We fill this tank or container with the fecal matter leaving an adequate margin at the top of said tank or container. We then add three to five per cent, in weight, of an absorbent material selected from the group of peat, or lignite. Thereupon we raise the temperature of the mixture to about 60° C. and agitate said mixture by means of any known device.

The reasons why we do this are as follows: Peat, lignite and the like on the one hand will retain and adsorb the undissolved substances and on the other hand eagerly absorb dissolved substances and gases contained in the fecal matter. Peat or lignite, however, will not readily act in this manner, if their pores are filled with air. Besides, these substances must act with a greatest possible surface in order to cause the adsorbing surface forces to come most effectively into action. We mix the treated matter with a small amount of a mass, such as peat or the like, and heat the mixture while agitating it, thus expelling the air from the mass, thus decomposing said mass into a great number of parts presenting an extended surface which comes into intimate contact with the fecal matter, and making it fit for absorbing the valuable fertilizing ingredients of the excrements. Another reason why we proceed in the manner indicated resides in the fact that peat and lignite as such have no fertilizing properties. We therefore have devised a process of manufacturing a fertilizer containing only a small percentage of peat and the like and this could only be done by adopting a method of improving the absorbing and adsorbing ability of the peat by expelling air or gases out of it and of causing excrements and peat to come into most intimate contact, in other words: of making the surfaces as large as possible.

After the mass has been agitated and heated in accordance with the composition of the fecal matter and of the chosen additional substances to a temperature up to 100° C. in the tank, there will be a residue at the bottom and a more or less clear liquid at the top which liquid may be taken off in any known way. The residue is now removed from the tank in such a consistency that it may be taken out by means of a shovel. One of the advantages of the process according to our invention resides in the fact that this residue although of colloidal structure may be centrifuged so as to reduce its contents of moisture to a very small amount. The product thus obtained is a most active organic fertilizer due to its colloidal character and its ability of forming carbonic acid.

The liquid which had been taken off above the residue in the tank is treated in any known way in order to precipitate the floating substances and the phosphoric acid which may still be contained in said liquid. The product in this way obtained is a muddy mineral nitrogen fertilizer.

When using the term "precipitate" we desire of being understood that we do not mean precipitation in a chemical sense nor the mere settling of solid matter from the mass but we intend to define therewith a process of settling of the solid dissolved and non-dissolved matter and a process of association of the solid matter with the entire additional matter such as peat or lignite or the like, which combined process takes place when carrying out our present invention.

The final product obtained by the process according to our invention has the following qualities: First, it is a most concentrated organic fertilizer containing a very small percentage of moisture and of non-fertilizer matter; second, this organic fertilizer shows a colloidal structure; third, it is thoroughly de-odorized and disinfected; fourth, it may be conveniently shipped on account of its small volume; and fifth, the product obtained by precipitating the floating substances in the liquid which is taken out of the tank is a valuable mineral nitrogen fertilizer.

In the accompanying drawing we have shown a diagrammatic sketch from which it may be seen how our new process is carried out in detail.

The fecal mass which is stored up in a container $a$ is conveyed in pre-determined quantities through the pump $b$, by way of the pipe conduit $c$ into the container $d$. In this container the fecal mass is agitated with the addition of peat and similar material from the container $e$ and heated by means of steam passing through serpentines or also through the double wall of the container $d$. Thereupon said mass is let off into the depositing container $f$ in which said mass separates into a muddy and a liquid part. The muddy part of said mass is conveyed by means of the worm conveyer $g$ or a similar device into the centrifuge $h$. The centrifuged mud if desired may be dried further in drying apparatus of known construction which apparatus is not shown in the drawing.

The liquid from the container $f$ as well as the water which is removed from the mass by means of the centrifuge $h$ is conveyed through the conduit $i$ into the collecting container $k$. From this container said liquid and water is pumped in pre-determined quantities into the agitating container $m$ by means of the pump $l$. Within this container the phosphoric acid which is still contained in the mass is caused to precipitate by addition of known precipitating agents from the container $n$. The depositing is accomplished within the container $o$. The above positioned water which is clear and free of putrefying constituents is conveyed through the conduits $t$ to the preliminary floating apparatus. The precipitated substances which are conveyed to the press $r$ by means of the worm conveyer $q$ are freed from water within said press $r$.

The apparatus which is required for grinding and mixing the two products thus obtained are well known to the art and therefore not incorporated in the drawing.

We claim:

1. The process of simultaneously producing an organic and a mineral fertilizer from fecal matter contained in sewage which process consists in mixing said fecal matter with three to five per cent, in weight, of an adsorbent material selected from the group consisting of peat and lignite, raising the temperature of the mixture in said container to about 60° C. while agitating said mixture, thus causing said material to eagerly absorb and adsorb solid organic fertilizing matter and also fertilizing gases out of the fecal matter forming part of said mixture; allowing the solid matter so obtained to settle; and removing the liquid from the separated solid matter; removing further amounts of liquid present in the solid matter by centrifuging; collecting all removed amount of liquid; and precipitating therefrom inorganic fertilizer constituents.

2. The process of simultaneously producing an organic and a mineral fertilizer from fecal matter contained in sewage which process consists in mixing said fecal matter with three to five per cent, in weight, of an adsorbent material selected from the group consisting of peat and lignite; raising the temperature of the mixture in said container to about 60° C. while agitating said mixture, thus causing said material to eagerly absorb and adsorb solid organic fertilizing matter and also fertilizing gases out of the fecal matter forming part of said mixture; allowing the solid matter so obtained to settle; and removing the liquid from the separated solid matter; removing further amounts of liquid present in the solid matter by centrifuging; collecting all removed amounts of liquid; precipitating therefrom inorganic fertilizer constituents; and returning the latter to the aforementioned solid matter which had been obtained by settling and centrifuging.

In testimony whereof we affix our signatures.

RICHARD FLUCK.
ALFRED THEIL.